United States Patent Office 3,501,417
Patented Mar. 17, 1970

3,501,417
CHEMICAL PROCESS CATALYST
Dennis A. DeMaio, Staten Island, N.Y., assignor to Halcon International, Inc., a corporation of Delaware
No Drawing. Filed May 27, 1966, Ser. No. 553,312
Int. Cl. B01j *11/20;* C07d *1/14*
U.S. Cl. 252—443                                    7 Claims

ABSTRACT OF THE DISCLOSURE

The invention relates to the production of ethylene oxide and particularly to an improved catalyst therefor. The improved catalyst has as an inventive feature the use of a support material having barium chemically combined therewith. The use of the improved catalyst in the controlled oxidation of ethylene oxide permits the operation of the oxidation zones at reduced temperatures, thereby increasing catalyst life without incurring penalties in ethylene conversion or ethylene oxide yield.

---

The present invention relates to a catalyst for the production of ethylene oxide by the vapor phase oxidation of ethylene. More specifically, the present invention relates to a catalyst which is superior in its chemical performance and exhibits greater longevity than those heretofore available even under the severe conditions of the oxidation process.

Ethylene oxide is a chemical extraordinary commercial importance. Of the several processes which have been developed for producing ethylene oxide, the most commercially satisfactory process centers about a vapor phase oxidation of ethylene. An important feature of this process resides in the catalyst over which the mixture of ethylene and oxygen and other gases is passed. Considerable effort has been expended in developing catalysts which provide a high yield of ethylene oxide from ethylene.

It is well known in the art of ethylene oxide manufacture, that small amounts of ethane in the reaction gas mixture have an activating effect upon the silver containing catalyst. With substantial ethane quantities in an ethylene feed stock, the yield of ethylene oxide from ethylene is lower, and the reaction of ethylene to carbon dioxide and water is promoted.

As commercial ethylene processes have been improved, the ethane content of ethylene feed stocks to ethylene oxide reactors has been steadily decreasing. In order to achieve a high overall ethylene conversion and preclude loss of ethylene in the plant purge gas, it has been necessary to increase the temperature of the reaction in the reaction zones in order to obtain the desired ethylene conversions. An unfortunate result of increasing reaction zone temperature is that catalyst life is drastically shortened.

This undesirable effect has been frequently encountered in the last reaction zone through which ethylene is passed. It is well known that ethylene can be oxidized in two or more stages to ethylene oxide and that in the last stage of oxidation, often called the purge zone, emphasis is placed upon converting essentially all of the ethylene fed to that reactor at whatever yields can be obtained. This is to be distinguished from the initial reaction zones wherein the ethylene conversion is not as great and the yield of ethylene oxide from ethylene is substantially higher. This is taught in U.S. Patent No. 2,764,598 among others.

At the temperatures required to convert essentially all the ethylene fed to the last reactor zone the life of catalyst is seriously shortened. Prior to the present invention it was necessary to operate purge reaction zones at from 250 to 260° C. At these temperatures it is necessary to frequently replace the expensive catalyst charges.

For the foregoing reasons, it is the purpose of this invention to develop catalysts which are more active and which consequently can be used at lower temperatures without sacrificing ethylene conversion and yield.

A new catalyst has now been discovered which permits the operation of ethylene oxide reaction zones at substantially lower temperatures at the same levels of ethylene conversion and yield as have been obtained with existing catalysts at higher temperatures.

The new catalyst is similar to those which have been used before except in one important respect. If the support material into which the silver is impregnated contains barium as one of its components, substantially improved results are obtained. The catalyst so prepared can be employed at lower temperatures without sacrificing ethylene conversion or yield.

In the following example a comparison of the new catalyst is made with the standard catalyst which has been used heretofore.

EXAMPLE 1

Gas mixtures of the following composition (which correspond to compositions found in commercial units) were passed over two catalyst beds. One catalyst bed contained standard catalyst, the other catalyst bed contained catalyst prepared by the method of this invention.

Feed gas composition, percent (volume):

$C_2H_4$ _____ 1.4
$O_2$ _____ 6.0
$C_2H_6$ _____ 0.001
Reaction Inhibitor, p.p.m. _____ None
$CO_2$ and $N_2$ _____ Balance The catalyst bed height in each case was the same. The feed rate of gas in each case was the same. The reactor pressure in each case was the same. Below is a comparison of the performance of each catalyst bed. Performance is measured in terms of EO, volume percent ethylene oxide produced in the reaction mixture and K, the conversion, expressed as percent, of feed ethylene converted over the catalyst zone. The catalysts have been compared at several different temperatures.

|  | Standard catalyst | New catalyst | |
|---|---|---|---|
| Silver content, percent | 14.98 | 14.78 | 15.40 |
| Silver, lbs./ft.³ of catalyst | 9.6 | 9.7 | 10.0 |
| Temperature, °C.: |  |  |  |
| 235 |  |  |  |
| EO (vol. percent) |  | .48 | .42 |
| K (percent) |  | 57.1 | 44.3 |
| 245 |  |  |  |
| EO | 0.34 | .56 | .54 |
| K | 29.6 | 66.1 | 56.0 |
| 255 |  |  |  |
| EO | 9.48 |  | .56 |
| K | 45.0 |  | 66.4 |
| 265 |  |  |  |
| EO | 0.56 |  |  |
| K | 55.7 |  |  |

It can be seen from the above table that the new catalyst permits the conversion of substantial quantities of ethylene in the production of ethylene oxide at much lower temperatures than the standard catalyst.

The following example makes a similar comparison of new catalyst and standard catalyst performance at the reaction conditions which are found in the initial reaction zones of a multi-zone production unit.

EXAMPLE 2

Gas mixtures of the following composition were passed through catalyst zones containing the standard catalyst and the catalyst of this invention.

| | Percent (volume) |
|---|---|
| $C_2H_4$ | 5.0 |
| $O_2$ | 6.0 |
| $C_2H_6$ | 0.1 |
| $CO_2$ and $N_2$ | Balance |

In each case the catalyst bed height was the same, in each case the feed rate of gas to the catalyst zone was the same. In each case the reactor pressure was the same. The table below compares the performance of several standard catalysts with that of the new catalyst. The volume percent ethylene oxide produced in the reaction mixture and the selectivity of the reaction to ethylene oxide are the variables which are compared.

STANDARD CATALYST

| Catalyst No | 1 | 2 | 3 | 4 | 5 |
|---|---|---|---|---|---|
| Temp. (° C.) | 245 | 245 | 245 | 245 | 245 |
| Reaction inhibitor, p.p.m. | 0.03 | .03 | .032 | .054 | .030 |
| EO (vol. percent) | 1.12 | 1.06 | 0.98 | 0.92 | 0.90 |
| Selectivity (percent) | 69.5 | 70.2 | 70.0 | 68.0 | 70.2 |

NEW CATALYST

| Catalyst No | 6 | 7 | 8 | 9 | 10 |
|---|---|---|---|---|---|
| Temp. (° C.) | 235 | 235 | 245 | 245 | 227 |
| Reaction inhibitor, p.p.m. | .042 | .031 | .50 | .78 | .068 |
| EO (vol. percent) | .94 | 1.08 | 1.16 | 1.04 | 1.00 |
| Selectivity (percent) | 68.6 | 67.1 | 68.5 | 69.8 | 68.5 |

At the standard test temperature of 245° C., both the new and standard catalysts yielded equivalent oxide at equal selectivity. However, the new catalyst required far more reaction inhibitor in the feed gas. This indicates its greater activity. At temperatures 10–18° C. lower than standard, the new catalyst in most instances exhibited slightly higher oxide levels at slightly lower selectivities. The new catalyst will yield equivalent results at a temperature between 227–245° C.

The support particles which are commonly used in ethylene oxide catalyst are usually comprised of silica-alumina or silicon carbide aggregate. Both of these materials can be either coated or impregnated with silver yielding catalysts which are approximately equivalent in activity and selectivity for the oxidation of ethylene.

The preferred support, however, is a silica-alumina which differs in chemical composition from the materials commonly available. The predominant difference between this preferred material and the standard material is the barium content. Variations in concentration of contained minor components other than barium appear to have little effect on catalyst activity.

Below is the composition of the support used in the above examples.

Percent by weight:

| | |
|---|---|
| $Al_2O_3$ | 88.10 |
| $SiO_2$ | 9.80 |
| $Fe_2O_3$ | 0.20 |
| $TiO_2$ | 0.16 |
| CaO | 0.55 |
| $Na_2O$ | 0.19 |
| MgO | 0.43 |
| BaO | 0.50 |
| $K_2O$ | 0.07 |
| Apparent porosity, percent | 55–60 |
| Water absorption, percent | 35–40 |
| Packing density, lbs./cu. ft. | 58–63 |
| Surface area, sq. meters/gm. | <1 |

The support of this invention may contain from 0.01% to 5.0% barium. Good results are obtained with supports containing from 0.05% to 3.0% barium and best results are obtained with supports containing from 0.30% to 1.0% barium.

Support particles, preferably spherical in shape and from 3/16 to 5/16 inch in average diameter are formed. The spheres are formed and fired by a technique which is well known and standard in the art of manufacturing catalyst supports.

The spherical particles are then impregnated with silver. In preferred practice, an impregnating solution in water of a silver salt of an organic carboxylic acid such as lactic acid is formed. Most preferably, silver oxide is added to an aqueous solution of an organic acid such as lactic acid and reacted to form a solution of the silver salt such as silver lactate. Silver salts of other acids such as oxalic, valeric, and the like can be employed.

It is desirable to form a highly concentrated solution of the silver salt, e.g., 60 to 75%, in order to achieve high silver concentration in the final catalyst composition. However, silver salt solutions having a concentration broadly in the range of about 25 to 80% can be employed.

It is usually desirable to add a small amount of an oxidizing agent such as hydrogen peroxide to prevent reduction of silver compound and precipitation of metallic silver during or before the support particle impregnation.

A promoter, such as barium, can be added to the silver salt solution, for example, as an aqueous barium lactate solution even though the support itself contains barium. The promoter is added in amount of about 1% to 25% by weight of silver in the catalyst.

The catalyst support particles are impregnated by complete immersion in the said solution. After a suitable soaking time, for example, 5 to 15 minutes or longer, the impregnated particles are separated from the remainder of the solution as by filtration. It is important during the soaking that the temperature be maintained at about the temperature of 90 to 95° C.

The impregnated particles are dried at a moderate temperature, desirably in the range of about 20 to 175° C. and preferably about 75 to 150° C. for at least 10 hours in an air atmosphere.

After drying, the catalyst particles are activated by heating to a sufficient temperature to decompose the organic silver salt. Desirably, the dried particles are gradually heated in an atmosphere of air to a temperature in the range of about 200 to 300° C. or higher and then held at this temperature for a sufficient time to complete the activation.

The finished catalyst composition contains about 5 to 25% by weight of silver. The support particles can be subjected to multiple impregnations with an intermediate insolubilization treatment to obtain catalysts with very high silver content.

The catalyst is employed in the production of ethylene oxide by the oxidation with molecular oxygen of ethylene. Oxidation conditions such as those previously known in the art can be employed. These conditions usually involve reaction temperature in the range of about 150 to 400° C. and usually 200 to 300° C. The reaction pressure is usually 50 to 500 p.s.i.g. and the gaseous feed mixtures contain 0.5 to 10% ethylene, 3 to 20% oxygen, and the remainder inerts such as nitrogen and $CO_2$. Recycle operations are preferably employed whereby a portion of the ethylene is reacted per pass. After separation of product ethylene oxide the unreacted ethylene is recycled to the reaction. Sufficient of the recycle gas is purged to prevent build up of inerts in the system. The purge gas is appropriately oxidized in a high conversion oxidation to recover as much ethylene oxide as possible.

In view of the foregoing disclosures, variations and modifications thereof will be apparent to one skilled in the art, and it is intended to include within the invention all such variations and modifications except as do not come within the scope of the appended claims.

What is claimed is:

1. An improved catalyst for the manufacture of ethylene oxide by the molecular oxygen oxidation of ethylene which comprises a silver impregnated support material, said support material consisting essentially of an inert material and having barium as an essential constituent of said support.

2. The ethylene oxide catalyst recited in claim 1 wherein the inert support material is silica alumina.

3. The ethylene oxide catalyst recited in claim 1 wherein the inert support material is silicon carbide aggregate.

4. The improved catalyst recited in claim 1 wherein barium is present in the support material in an amount in the range of 0.01 to 5.0% by weight.

5. The improved catalyst recited in claim 1 wherein the barium is in the form of barium oxide.

6. An improved catalyst for the manufacture of ethylene oxide by the molecular oxygen oxidation of ethylene which comprises from 5 to 25% by weight of total catalyst silver supported on spheres of silica alumina, said spheres having from 0.5 to 3.0% by weight barium.

7. A catalyst as recited in claim 6 wherein said spheres have a diameter in the range of $3/16$ to $5/16$ inch.

References Cited

UNITED STATES PATENTS

| | | | |
|---|---|---|---|
| 3,083,213 | 3/1963 | Courter | 260—348.5 |
| 3,121,099 | 2/1964 | Endler | 260—348.5 |
| 3,207,700 | 9/1965 | Saffer | 252—454 X |
| 3,332,887 | 7/1967 | Endler | 252—443 |

DANIEL E. WYMAN, Primary Examiner

C. F. DEES, Assistant Examiner

U.S. Cl. X.R.

252—454, 455, 457; 260—348.5